J. H. WATTERS.
VEHICLE WHEEL.
APPLICATION FILED JULY 22, 1909.
960,460.
Patented June 7, 1910.
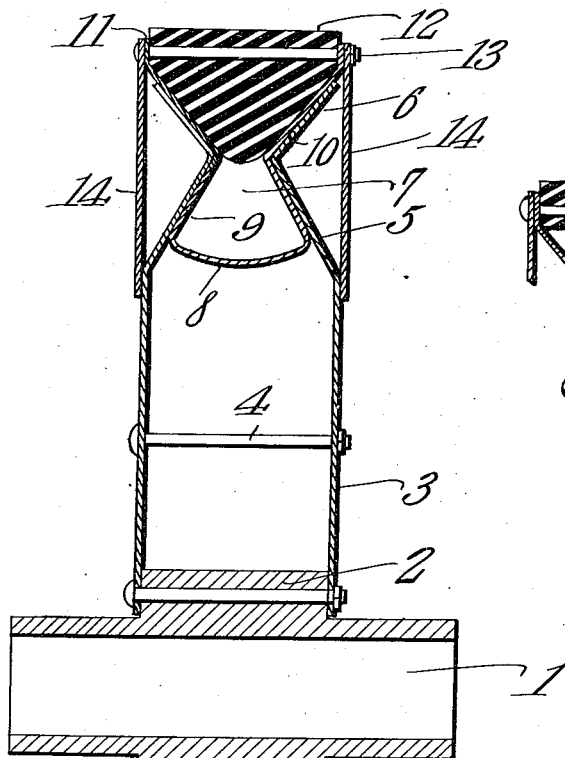
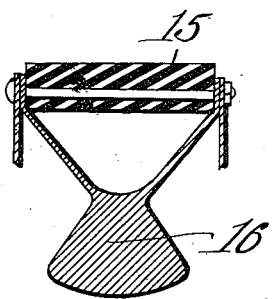
Fig. 2.
Fig. 1.
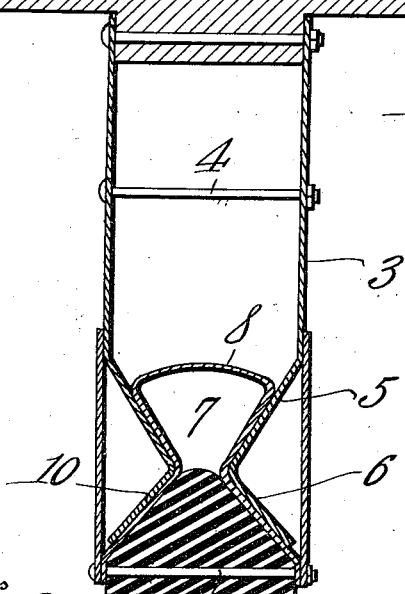
Witnesses
Inventor
John H. Watters.
By C. A. Snow & Co.
Attorneys

UNITED STATES PATENT OFFICE.

JOHN HENRY WATTERS, OF AUGUSTA, GEORGIA.

VEHICLE-WHEEL.

960,460.      Specification of Letters Patent.      Patented June 7, 1910.

Application filed July 22, 1909. Serial No. 508,962.

*To all whom it may concern:*

Be it known that I, JOHN H. WATTERS, a citizen of the United States, residing at Augusta, in the county of Richmond and State of Georgia, have invented a new and useful Vehicle-Wheel, of which the following is a specification.

This invention relates to improvements in spring wheels and has for its object the provision of a strong, durable and efficient wheel in which the rim will serve to cushion the wheel and prevent injury to the felly when traveling over rough roads, the rim being so constructed that it will support the wheel at both top and bottom.

With this object and other incidental objects in view, the invention consists in certain novel features of construction and arrangements which will be hereinafter first fully described and then specifically pointed out in the claim.

In the annexed drawings, which fully illustrate my present invention, Figure 1 is a vertical section of a wheel embodying my improvements, and Fig. 2 is a detail sectional view of the rim showing a modified construction.

In carrying out my invention I employ a hub 1 having an annular flange 2 to which flange are bolted resilient disks or circular plates 3 which are spaced apart and are connected by bolts 4 in order that the tension of the disks or circular plates may be regulated as desired. The edges of the plates are deflected laterally so as to present the converging flanges 5, and the diverging flanges 6 extending from the said converging flanges. The rim 7 is fitted between the said flanges 5 and 6 of the resilient disks and is preferably formed of sheet metal having an inner annular head 8 which has converging sides 9 and is adapted to fit between the inner converging flanges 5 of the disk 3. From the edges of these converging sides 9 the rim diverges, as shown at 10, and the edges of these diverging portions are bent to form parallel radially disposed walls 11 between which the tire 12 is secured by suitable bolts 13. Secured to the said parallel walls 11 of the rim and projecting inward therefrom are yieldable guards 14 and extending inward beyond the converging flanges 5 of the disk so as to prevent the entrance of dirt or other foreign matter to the flanges and the rim.

From the foregoing description, it will be readily seen that I have provided an hour glass form of construction at the rim of the wheel and as a result of this construction I furnish supports at both top and bottom of the wheel. When a load is placed on the wheel, the lower portion of the tire, being in contact with the ground, will be pushed upward so that the diverging walls 10 of the rim will be caused to bear against the diverging flanges 6 of the disks 3 and the rim will, consequently, be moved slightly upward so that at the top of the wheel the diverging walls 9 of the rim will be thrown against the converging flanges 5 of the disks and, consequently, caused to bear against the same so as to aid in supporting the load. As the wheel revolves the relative positions of the rim and the flanges of the resilient disks will shift so that as the lower portion of the tire rises to the top of the wheel, the load will be transferred from the outer flanges of the disk and the outer walls of the rim, to the inner flanges of the disk and the inner walls of the rim.

In Fig. 1 I have shown the rim as being hollow and the tire as substantially V-shaped in cross section so as to entirely fill the outer portion of the rim. The tire, however, may be of less thickness so as to merely fit between the outer edges of the rim, as shown in Fig. 2, in which 15 designates the tire, and the rim may be constructed with a solid inner portion, as indicated at 16 in Fig. 2, so as to reinforce the inner portion of the rim, as will be understood.

The device is extremely simple in its construction and efficient in operation. If so desired, a lubricant may be placed within the pockets formed by the flanges of the disks and the guards 14 so as to make the movement of the rim upon the said flanges free and easy.

Having thus described my invention, what I claim is:

A wheel comprising spaced resilient disks having their outer edges shaped to present converging annular flanges and diverging annular flanges at the edges thereof, and a rim having a substantially hour glass form fitted between the said flanges of the disks.

In testimony that I claim the foregoing as my own, I have hereto affixed my signature in the presence of two witnesses.

JOHN HENRY WATTERS

Witnesses:
 THOS. J. POPE,
 CARRIE F. SASSER.